United States Patent [19]

Burger

[11] Patent Number: 4,923,541

[45] Date of Patent: May 8, 1990

[54] METHOD FOR MAKING COMPOSITE REINFORCED TUBES

[76] Inventor: George Burger, 4 Carmel Dr., Novato, Calif. 94947

[21] Appl. No.: 260,866

[22] Filed: Oct. 22, 1988

[51] Int. Cl.$^5$ .............................................. B32B 31/20
[52] U.S. Cl. ...................... 156/87; 156/156; 156/184; 156/245; 156/446; 156/500; 264/314
[58] Field of Search ............... 156/87, 155, 156, 173, 156/184, 245, 500, 62.2, 446; 264/314

[56] References Cited

U.S. PATENT DOCUMENTS

| | | | |
|---|---|---|---|
| 2,616,463 | 11/1952 | Potchen | 144/268 |
| 2,649,133 | 8/1953 | Just | 154/1.8 |
| 2,674,557 | 4/1954 | Boggs | 154/83 |
| 2,768,920 | 10/1956 | Stout | 154/83 |
| 2,964,065 | 12/1960 | Haroldson | 138/76 |
| 3,125,478 | 3/1964 | Pratt | 156/184 |
| 3,367,816 | 2/1968 | Bluck | 156/446 |
| 3,513,051 | 5/1970 | Lichfield | 156/245 |
| 3,579,400 | 5/1971 | Kanyok | 156/294 |
| 3,666,598 | 5/1972 | Christie | 156/361 |
| 3,879,244 | 4/1975 | Varlas | 156/192 |
| 3,999,912 | 12/1976 | Hall | 425/84 |
| 4,005,234 | 1/1977 | Stroupe | 156/245 |
| 4,169,749 | 10/1979 | Clark | 156/156 |
| 4,172,175 | 10/1979 | Pearson | 428/376 |
| 4,273,601 | 6/1981 | Weingart | 156/189 |
| 4,348,247 | 9/1982 | Loyd | 156/156 |
| 4,579,617 | 4/1986 | Oberg et al. | 156/184 |
| 4,759,893 | 7/1988 | Krauter | 264/314 |

*Primary Examiner*—Caleb Weston

[57] ABSTRACT

An improved method and apparatus for the manufacturing of advanced composite tubes involving the steps of wrapping various layers, including a composite layup, around an elongated mandrel, placing the mandrel with layers applied in a tubular female mold, expanding the diameter of the mandrel, thus forcing the various layers to compress against the surface of the female mold.

In order to remove excess resin from the layup this method also incorporates a resin absorbing layer which is wrapped around the mandrel prior to the composite layup. In addition, all the layers necessary to produce the tube are wrapped around the mandrel with a wrapping apparatus in which the various layers are first placed flat on a sheet. The sheet is then pulled around the mandrel, mechanically transferring the various layers to the perimeter of the mandrel. This method results in the formation of high quality composite tubes with smooth external surface finishes.

20 Claims, 4 Drawing Sheets

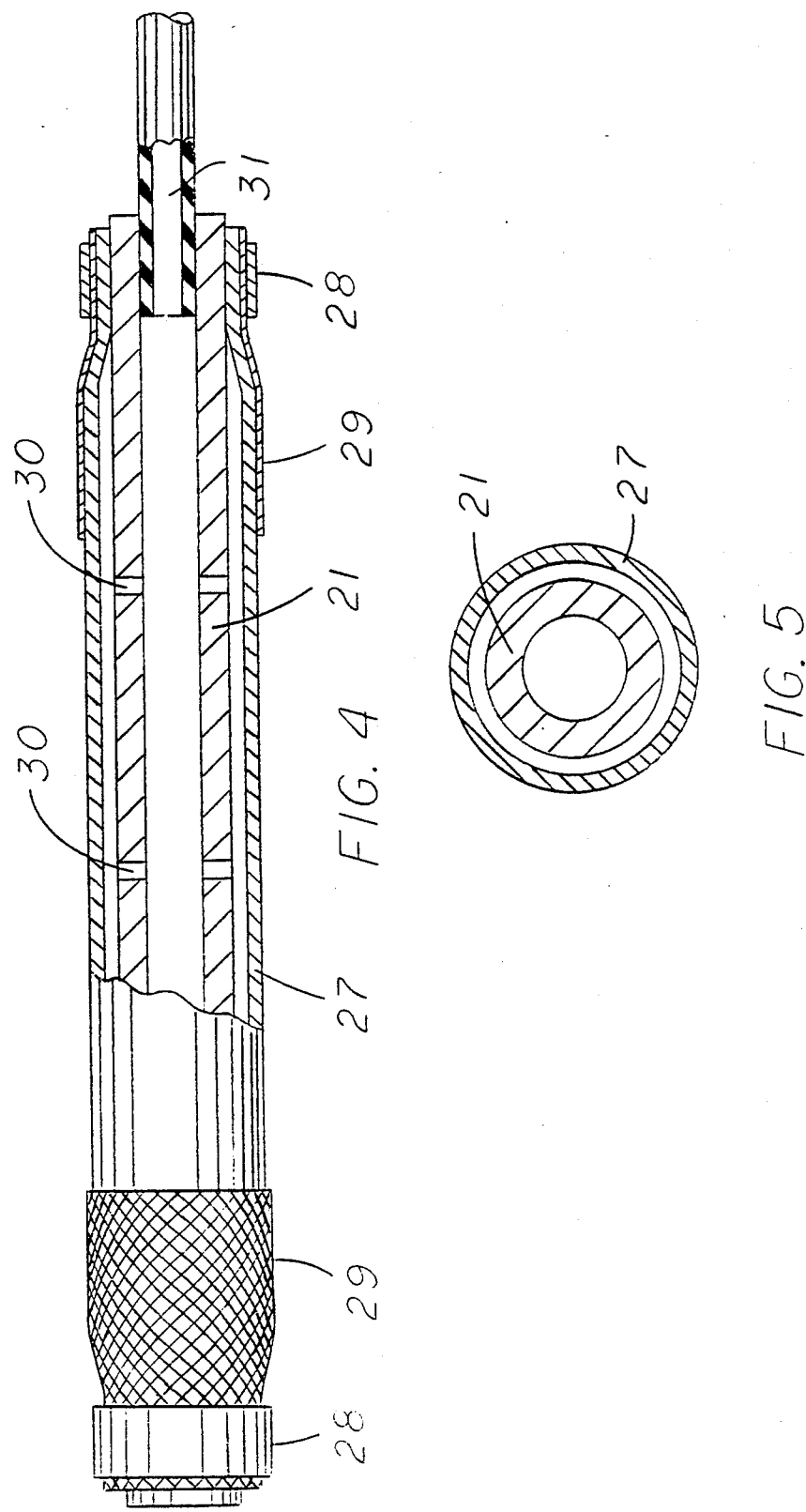

ial, all at 6.1 cp, are Mozart, al., specifically, al members for making specifically relates to a process and apparatus fically for making tubular members such as masts and poles, specifically to tubular members which are composed of advanced composite materials.

METHOD FOR MAKING COMPOSITE REINFORCED TUBES

BACKGROUND-FIELD OF INVENTION

This invention relates to a process and apparatus for making tubular members such as masts and poles, specifically to tubular members which are composed of advanced composite materials.

BACKGROUND-DESCRIPTION OF PRIOR ART

Heretofore a variety of methods have been used to manufacture composite tubes. A majority of these involve the use of some type of filament winding apparatus. This apparatus generally is very complicated and limited in capability.

U.S. Pat. No. 4,273,601 granted to Oscar Weingart on June 16, 1981 discloses a means of producing composite tubes by helically winding high strength filament tapes on an elongated mandrel. These tapes are presaturated in an uncured thermoset resin then helically wrapped on the mandrel with substantial overlap between layers. After the desired wrapping is completed and the resin cures, the tube is removed from the mandrel. This method requires the use of a fairly complicated filament winding apparatus and since the controlling surface is the internal mandrel, the exterior finish will tend to be textured, rather than smooth.

U.S. Pat. No. 4,172,175 granted to Everett Pearson on Oct. 23, 1979 discloses a manufacturing process which creates a tube by combining layers applied to a mandrel by a filament winding process and layers manually placed along the longitudinal axis of the filament winding mandrel. This method is capable of producing tubes that can vary in strength and stiffness, both longitudinally and circumferentially. However the method still requires the use of a filament winding machine and the manual placement of layers on a mandrel, a difficult and time-consuming process. Again, since the tubes produced are molded on an interior mandrel a textured exterior finishes will be produced.

A tube manufacturing method is known in which tubes are produced by placing the fibers which will comprise the tube on a molding sheet with dimensions slightly larger than those of the fibers placed on it. The fibers are then oversaturated with uncured resin and an expandable tubular mandrel is placed on top of the layup. The molding sheet is subsequently folded over the mandrel, allowing the ends of the composite layup to drape over the mandrel and the ends of the sheet are fastened together. The mandrel is then expanded, compacting the layup against the molding sheet and to some extent forcing entrapped air and excess resin to flow out the two open ends of the tube formed and also out from the seam where the ends of the molding sheet are fastened together. Although this method offers many advantages, it can not be readily used to form more than a small number of layers of composite materials, simply expanding the mandrel in the tube does an inadequate job removing excess resin and entrapped air.

OBJECTS AND ADVANTAGES

Accordingly, I claim the following as my primary objects and advantages: The capability of producing a variety of composite tubes with the use of only one simple and inexpensive apparatus and the capability of producing such tubes at a high rate of production.

I also claim the following additional objects and advantages: The capability to easily fabricate composite tubes with varying cross-sections and tubes with smooth exterior surfaces.

Further objects and advantages of my invention will become apparent from a consideration of the drawings and ensuing description.

DRAWING FIGURES

FIG. 4 shows a sectional view of the mandrel assembly with a bladder used in the apparatus separated from a mandrel.

FIG. 5 shows a cross-section of the mandrel assembly with the bladder separated.

DRAWING REFERENCE NUMBERS

21: Mandrel
22: Conveying sheet
23: Frame
24: First Layer
25: Second Layer
26: Third Layer
27: Bladder
28: Bladder Seal
29: Fiber Reinforcements
30: Openings
31: Pressurization Port
32: Isolation Sheet
33: Breather Cloth
34: Perforated Sheet
35: Layup
36: Resin Containment Sheet
37: Tapered Mold

GENERAL DESCRIPTION

Figure 1:
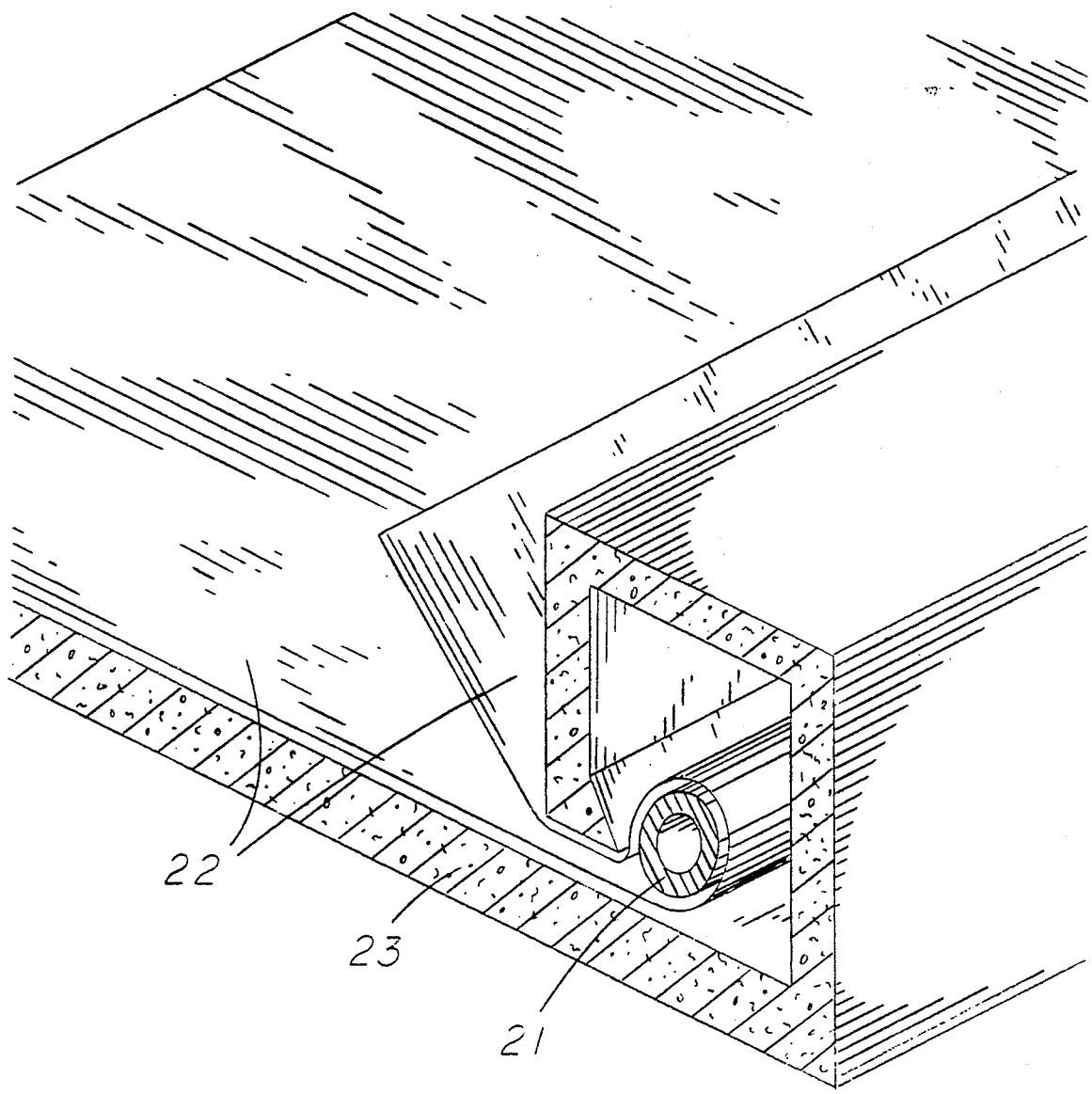
FIG. 1 shows a view of a rolling apparatus for producing composite tubes in accordance with my invention.
Figure 2:
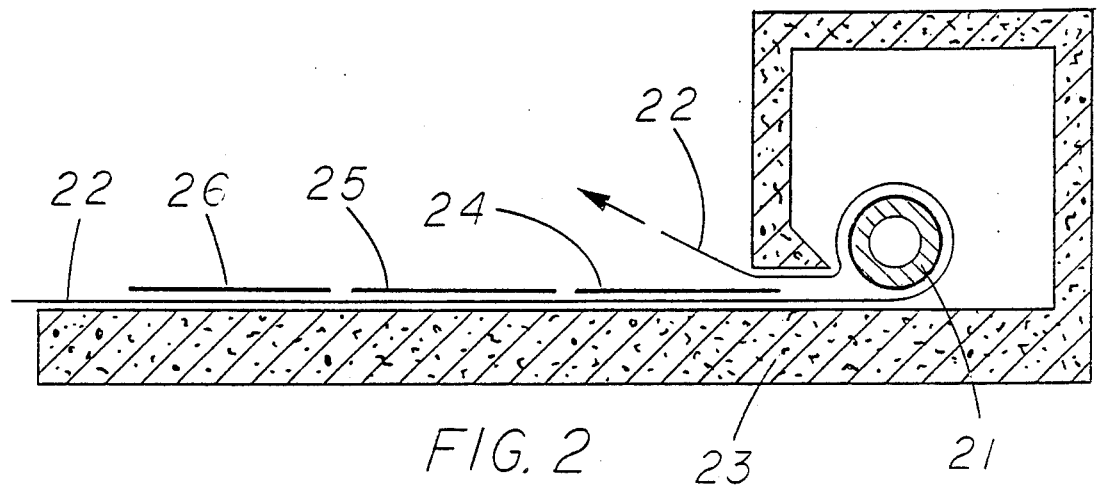
FIG. 2 shows an end view of the rolling apparatus before its rolling operation.
Figure 3:
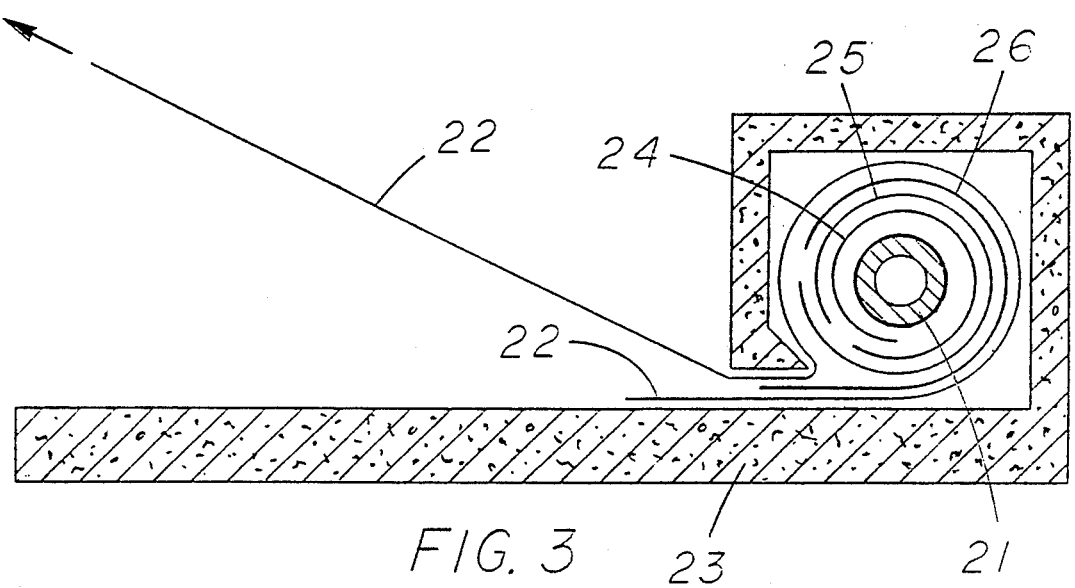
FIG. 3 shows an end view of the rolling apparatus before its rolling operation.
Figure 6:
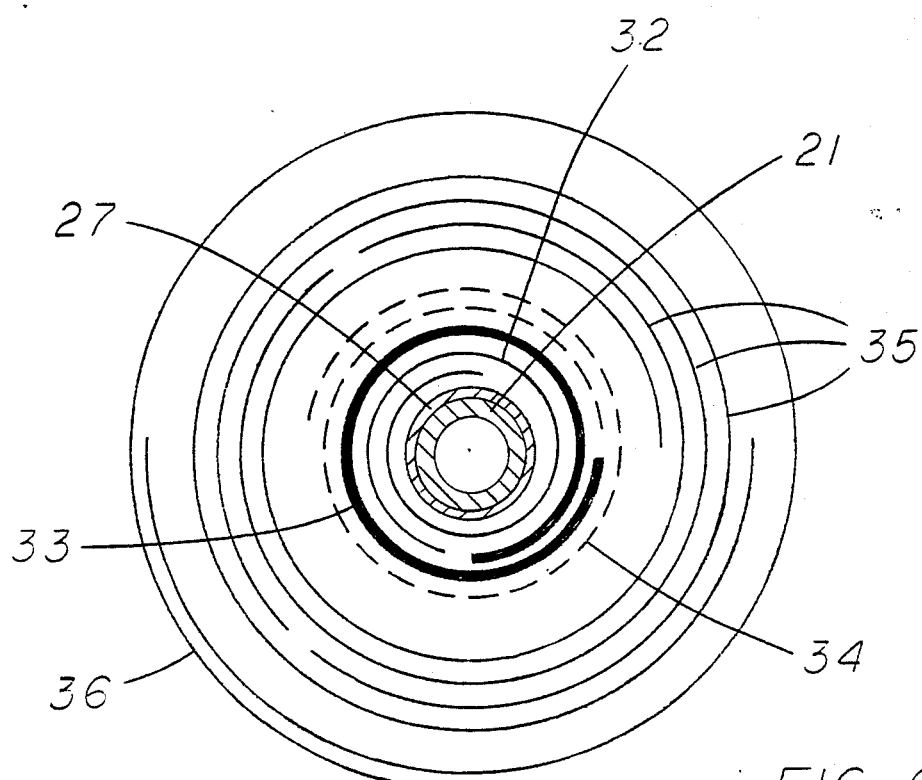
FIG. 6 shows a cross-section of a tube layup assembly.
Figure 7:
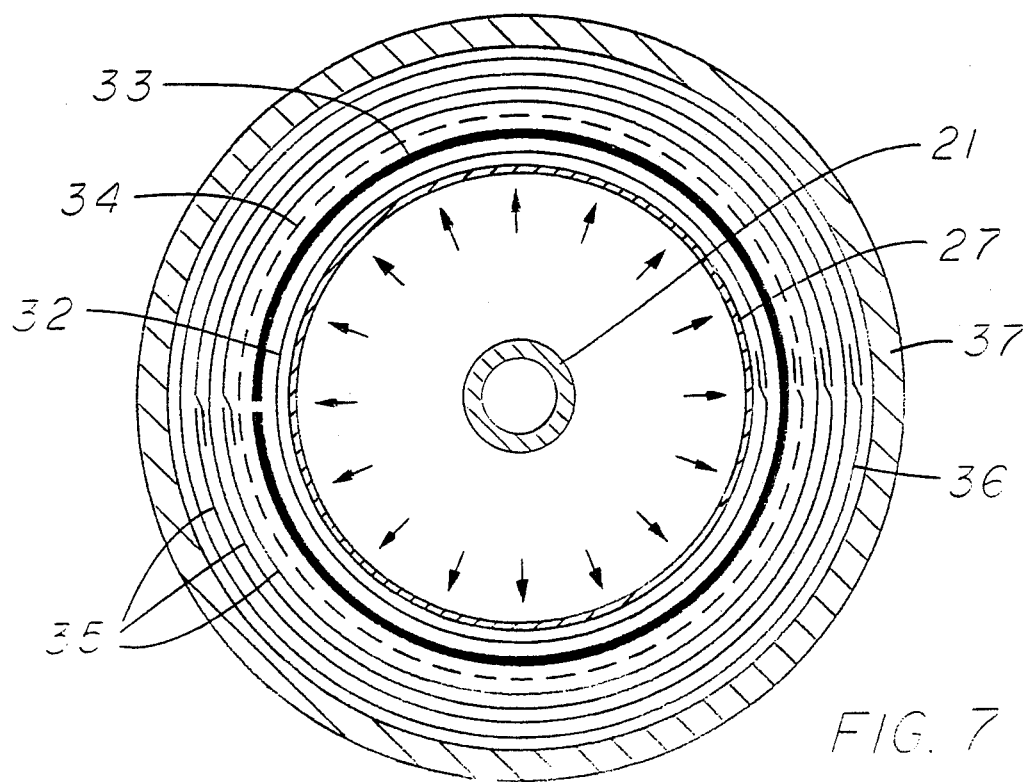
FIG. 7 shows a cross-section of the tube layup assembly in a mold after pressurization.

FIG. 1 shows an isometric view of a version of a rolling assembly. This assembly consists of a conveying sheet 22 which preferably is made from a sheet material such as Mylar polyester film; Mylar is a trademark of E. I. de Nemours & Co., Wilmington, Del., a mandrel 21, and a frame 23. FIGS. 2 and 3 show the relationship between a first layer 24, a second layer 25, and a third layer 26 before and after being wrapped around the mandrel. FIG. 4 shows a sectional view of the mandrel assembly. This assembly consists of a mandrel 21 with a plurality of openings 30 and a pressurization port 31. It also contains a bladder 27 made of an elastic or flexible material with glass or other fiber reinforcements 29 laminated on the ends and two bladder seals 28 consisting of clamps or a multitude of string wrappings. In FIG. 6, mandrel 21 is again shown with bladder 27 positioned against it. The first or inner layer consists of an isolation sheet 32. This sheet is constructed of impermeable plastic film or sheet such as nylon or polyethylene. The next layer is a breather cloth 33. This layer consists of a porous fabric, such as cotton, glass, or polyester. After that comes perforated sheet 34. This sheet may also be constructed of impermeable plastic film or sheet though must be perforated with small holes on the order of 0.50 mm or less. Next are all the layers which comprise a tube layup 35. These layers will vary in number, depending on the application, and will be comprised of advanced composites such as graphite, glass, or polyaramide fibers saturated in a curable thermoset resin such as polyester, vinylester, or epoxy. The final layer is a resin containment sheet 36. This sheet is constructed of a rigid plastic film, such as Mylar polyester film; Mylar is a trademark of E. I. DuPont de Nemours & Co., Wilmington, Del.,. This entire assembly is contained in a mold 37 as seen in FIG. 7.

OPERATION OF INVENTION

The process used to produce the tubes takes advantage of a setup similar to the one depicted in FIG. 1. The length of the setup and correspondingly the composite tube produced can be of any length. In this setup, a conveying sheet 22 is placed on frame 23 and threaded around mandrel 21 as shown. This mandrel not being held by anything but the conveying sheet so that it can freely float relative to the frame.

Materials intended to be wrapped around mandrel 21 are first placed on conveying sheet 22 as shown in FIG. 2. This conveying sheet is subsequently pulled in the direction of the arrow, forcing the materials to wrap around the mandrel as shown in FIG. 3. After the conveying sheet travels slightly less than one revolution around the mandrel, it contacts the frame, making an abrupt change in direction. Since the materials to be wrapped are not attached to the conveying sheet, they resist making this abrupt change in direction and continue to travel around the mandrel.

By the nature of this system, when materials are placed on the sheet, the material placed closest to the mandrel will be the first or inner layer when wrapped. The material placed next to that will be the second, the one next to that, third, the one next to that, fourth, etc. This relationship holds true no matter how many layers are wrapped.

My invention combines this process with a means for compacting the various layers against a female mold, and a means for removing entrapped air and excess resin from the composite assembly. The means for compacting the various layers is provided by incorporating an expandable mandrel into the assembly. When expanded, this mandrel forces the various layers wrapped around it to move out and compact against a female mold provided. The bleeding system used to remove entrapped air and excess resin is provided by incorporating layers comprising the bleeding system in the layup assembly.

The means of expanding the diameter of the mandrel is incorporated by placing a bladder 27 on the surface of the mandrel and by providing a means of introducing fluid pressure to the bladder when the layup is placed in the appropriate mold. This mandrel assembly is depicted in FIG. 4 with a cross-section depicted in FIG. 5. For purposes of clarity, bladder 27 is shown separated from mandrel 21. In actuality, the bladder would be in contact with the mandrel along its entire surface. The bladder would preferably be made of rubber or other elastic material which would contract against the mandrel when not inflated. In order for the bladder to be capable of freely expanding and contracting radially, while not rupturing the ends when pressurized, fiber reinforcements 29 oriented at approximately +/−30 degrees to the longitudinal axis of the mandrel are laminated to the bladder at both ends.

The bleeding system is composed of a breather cloth 33 followed by a perforated sheet 34; these comprise the second and third layers on the mandrel. When the assembly is compressed against the mold, the breather cloth allows the entrapped air and excess resin a place to go and the perforated sheet isolates the breather cloth from the composite layup. The first layer on the mandrel is a sheet of nonperforated plastic required to isolate the rubber bladder from the resin. The actual composite layers which comprise the tube itself start at layer four and continue for as many layers or plys as is necessary to form the tube. These layers are saturated with curable resin prior to the tube being rolled up. The optimal way of introducing this resin to the layup is to pre-roll most of the fiber layers around the mandrel before any resin is introduced, then saturating the last few layers with an excessive amount of resin and completing the rolling operation. When compaction occurs, the excess resin contained in the last few layers rolled will be forced to travel through all the "dry" layers of fibers before reaching the breather cloth thereby performing a better job expelling entrapped air from the layup while saturating the "dry" layers.

After all the layers of the layup are rolled on the mandrel. The final layer consists of the resin containment sheet 36 and is composed of a thin (approx. 0.050 mm thick) plastic film such as Mylar polyester film; Mylar is a trademark of E. I. duPont de Nemours & Co., Wilmington, Del. This sheet is necessary to enable the uncured assembly to be removed from the conveying sheet. It also provides the surface finish of the final product and allows the assembly to be easily removed from the mold without the use of any release agents. A cross-section of this entire layup assembly is depicted in FIG. 6.

After the rolling operation is completed, the layup assembly is removed from the rolling apparatus. Frame 23 shown is depicted an being one solid unit, therefore the layup assembly FIG. 6 would have to be removed from the end. This frame could easily be modified to be capable of opening up thereby allowing the layup assembly to be removed from the side.

After removal from the rolling assembly, the layup assembly is then transferred to a mold. There are three possible molds which can be employed. The first is simply a roll of plastic comprising enough layers to inhibit the tube from expanding. This roll would be held together by taped placed along its length and simply untaped for part removal. The second mold type is a solid tapered tube. The taper would allow the finished part to be forcibly removed from the end. The third mold type is a standard clam shell type composed of two mold halves clamped together.

After the part is put in the mold, fluid pressure is introduced to the mandrel assembly through the pressurization port. This pressure inflates the bladder, thus expanding its diameter and forcing the various layers outward until they are stopped by the mold. This is depicted in FIG. 7 which shows a cross-section of the assembly in tapered mold 37. The pressurized bladder compacts the layup assembly against the mold, expelling entrapped air and excess resin through the perforated sheet into the breather cloth. To reduce internal friction, layers of the assembly are of such a length that when the bladder is inflated, most will overlap themselves only slightly and layers in the layup consisting of fibers running longitudinally need only be flush with little or no gap existing between the edges.

After the part cures, the pressure is released from the mandrel assembly, allowing the bladder to deflate. The mandrel assembly is then easily removed from the tube followed by the perforated sheet and breather. The tube is then removed from the mold.

The physical properties of the composite tubes produced are controlled by the following factors: (1) The selecting of the fiber/resin combination. (2) Controlling the number, thickness, and orientation of individual plys which comprise the tube (3) The corporation and placement of extra plys at specific locations both longitudinally and circumferentially along the tube. This is accomplished by the strategic placement of these extra plys on the conveying sheet such that the location on the conveying sheet corresponds to the the desired location on the tube. (4) incorporating a core material in the middle of the layup. (5) Using molds with a variety of cross-sections, both symmetric and asymmetric with lengths both tapered and straight.

The reader will see that I have provided a novel tube manufacturing process which can produce a variety of composite tubes, yet which requires no complicated or expensive apparatus and is extremely versatile in its capabilities. This process is also capable of forming such tubes at a high rate of production. In addition the reader will see that since this manufacturing process uses a female mold the external finish of the tube is not affectedly the composite layup used or variations in wall thickness.

While my above description contains may specifics, these should not be constructed as limitations on the scope of the invention, but rather as an exemplification of one preferred embodiment thereof. Many other variations are possible. For example when manufacturing nontapered tubes, the conveying sheet used in the rolling assembly could be comprised of a continuous loop. Also, a prepreg composite could be used instead of the "wet" layup described. Accordingly, the scope of the invention should be determined not by the embodiment illustrated, but by the appended claims and their legal equivalents.

I claim:

1. A method of fabricating a composite tube which comprises the steps of:
   (a) wrapping a plurality of layers around an outer surface of an expandable mandrel such that said layers are wrapped in substantially concentric relationship to said mandrel with at least one of said layers comprising reinforcing fibers impregnated with resin, at least a second of said layers comprising an absorbent material with said absorbent material being placed between said mandrel and said layer of reinforcing fibers, and at least a third of said layers comprising a perforated sheet of impermeable material, said perforated sheet being placed between and isolating said layer of absorbent material from said layer of reinforcing fibers;
   (b) placing said mandrel and said plurality of layers in an elongated tubular female mold ; and
   (c) pressurizing said expandable mandrel to cause said mandrel to expand and move said plurality of layers outwardly , thereby compacting said layers against an inner surface of said mold and forcing entrapped gas and excess resin to travel through said perforated sheet and enter said absorbent layer.

2. The method of claim 1, further comprising the step of overlapping an end portion of said layer of reinforcing fibers with another end portion thereof.

3. The method of claim 1, further comprising placing a layer of impermeable material between and isolating said expandable mandrel from said absorbent layer.

4. The method of claim 1, further comprising placing a layer of impermeable material between and isolating said layer of reinforcing fibers and said female mold.

5. The method of claim 1, wherein, prior to said step of placing, selecting said mold of a type characterized by a single sheet of material wrapped in a substantially tubular form.

6. The method of claim 1, wherein, prior to said step of placing, selecting said mold of a type characterized by a substantially solid tapered tube.

7. The method of claim 1, wherein, prior to said step of placing, selecting said mold of a type comprising two parts.

8. The method of claim 1 further comprising the steps of:
   prior to step (a), positioning a conveying sheet adjacent to a portion of said outer surface of said mandrel; and
   positioning said plurality of layers on said conveying sheet;
   wherein, step (a) comprises pulling said conveying sheet along at least a portion of said outer surface of said mandrel such that said layers are sequentially wrapped onto said outer surface of said mandrel.

9. The method of claim 8 further comprising the step of:
   prior to said step of positioning said conveying sheet, positioning said mandrel in a cavity defined by a frame member such that said mandrel may freely rotate therein;
   wherein, said step of positioning said conveying sheet comprises threading said conveying sheet into said cavity and around a substantial portion of said mandrel and back out of said cavity.

10. The method of claim 8 wherein step (a) further comprises pulling said conveying sheet such that it has an abrupt change in direction adjacent to said mandrel whereby said layers resist making this abrupt change in direction and continue to travel around said mandrel to be wrapped thereon.

11. A method of fabricating a composite tube which comprises the steps of:
   wrapping a plurality of layers around an outer surface of an expandable mandrel such that said layers are wrapped in substantially concentric relationship to said mandrel with at least one of said layers comprising reinforcing fibers, at least a second of said layers comprising a breather cloth placed between said mandrel and said layer of reinforcing fibers, and at least a third of said layers comprising a perforated sheet of impermeable material, said perforated sheet being placed between and isolating said layer of breather cloth and said layer of reinforcing fibers;
   placing said mandrel and said plurality of layers in an elongated tubular female mold; and
   pressurizing said expandable mandrel to cause said mandrel to expand and move said plurality of layers outwardly, thereby compacting said layers against an inner surface of said mold and forcing entrapped gas to travel through said perforated sheet and enter said breather cloth.

12. The method of claim 11 wherein said layer of reinforcing fibers is impregnated with resin.

13. The method of claim 11 further comprising placing a layer of impermeable material between and isolating said expandable mandrel from said breather cloth.

14. The method of claim 11 further comprising placing a layer of impermeable material between and isolating said layer of reinforcing fibers and said female mold.

15. The method of claim 11 further comprising the steps of:

prior to said step of wrapping said plurality of layers, positioning a conveying sheet adjacent to a portion of said outer surface of said mandrel; and positioning said plurality of layers on said conveying sheet;

wherein, said step of wrapping said plurality of layers further comprises pulling said conveying sheet along at least a portion of said outer surface of said mandrel such that said layers are sequentially wrapped onto said outer surface of said mandrel.

16. A method of fabricating a composite tubular member comprising the steps of:

positioning a flexible conveying sheet adjacent to an outer portion of a rotatable and inflatable mandrel;

positioning layers of material adjacent to one another on said conveying sheet;

moving said conveying sheet around said outer portion of said mandrel such that said material layers are wrapped thereon;

positioning said mandrel with said material layers wrapped thereon in a molding apparatus; and expanding said mandrel such that said material layers are compacted against an inner surface of said molding apparatus.

17. The method of claim 16 wherein said step of moving said conveying sheet comprises making an abrupt change in direction of said conveying sheet after said conveying sheet has moved around a substantial portion of said outer surface of said mandrel.

18. The method of claim 16 wherein said step of positioning said material layers comprises:

positioning a layer of absorbent material on said conveying sheet;

positioning a perforated layer of substantially impermeable material on said conveying sheet;

positioning a layer of reinforcing fibers impregnated with a plastic resin on said conveying sheet; and sequentially wrapping said layers onto said mandrel.

19. The method of claim 18 wherein said step of positioning said material layers further comprises, prior to said step of positioning said layer of absorbent material, positioning a substantially impermeable layer on said conveying sheet.

20. The method of claim 18 wherein said step of positioning said material layers further comprises, after said step of positioning said layer of reinforcing fibers, positioning a substantially impermeable layer on said conveying sheet.

* * * * *